United States Patent
Kawasaki

(10) Patent No.: US 10,395,131 B2
(45) Date of Patent: Aug. 27, 2019

(54) APPARATUS, METHOD AND NON-TRANSITORY STORAGE MEDIUM FOR CHANGING POSITION COORDINATES OF A CHARACTER AREA STORED IN ASSOCIATION WITH A CHARACTER RECOGNITION RESULT

(71) Applicant: CANON KABUSHIKI KAISHA, Tokyo (JP)

(72) Inventor: Hiromasa Kawasaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 181 days.

(21) Appl. No.: 15/424,202

(22) Filed: Feb. 3, 2017

(65) Prior Publication Data
US 2017/0249526 A1 Aug. 31, 2017

(30) Foreign Application Priority Data
Feb. 26, 2016 (JP) .................................. 2016-036188

(51) Int. Cl.
*G06K 9/34* (2006.01)
*G06K 9/20* (2006.01)
(Continued)

(52) U.S. Cl.
CPC .............. *G06K 9/344* (2013.01); *G06F 3/011* (2013.01); *G06K 9/2081* (2013.01);
(Continued)

(58) Field of Classification Search
None
See application file for complete search history.

(56) References Cited

U.S. PATENT DOCUMENTS 8,831,364 B2 9/2014 Kawasaki
9,053,350 B1 * 6/2015 Abdulkader ........... G06K 9/033
(Continued)

FOREIGN PATENT DOCUMENTS

| JP | H11102414 A | * | 7/1997 |
| JP | 2000155802 A | * | 11/1998 |
| JP | 2015-103114 | | 6/2015 |

OTHER PUBLICATIONS

Abdulkader et al, Low Cost Correction of OCR Errors Using Learning in a Multi-Engine Environment, 2009 10th International Conference on Document Analysis and Recognition. (Year: 2009).*
(Continued)

*Primary Examiner* — Andrae S Allison
(74) *Attorney, Agent, or Firm* — Venable LLP

(57) ABSTRACT

In the case where a user extracts a desired character string by specifying a range by using a finger or the like of him/herself on an image including a character, a specific character (space or the like) located at a position adjacent to the desired character string is prevented from being included unintendedly in the selected range. The character area corresponding to each character included in the image is identified and character recognition processing is performed for each of the identified character areas. Then, from results of the character recognition processing, a specific character is determined and the character area corresponding to the determined specific character is extended. Then, the range selected by the user in the displayed image is acquired and character recognition results corresponding to a plurality of character areas included in the selected range are output.

17 Claims, 8 Drawing Sheets

(51) Int. Cl.
*G06K 9/46* (2006.01)
*G06F 3/01* (2006.01)
*G06F 3/0488* (2013.01)

(52) U.S. Cl.
CPC .......... *G06K 9/4642* (2013.01); *G06F 3/0488* (2013.01); *G06K 2209/01* (2013.01)

(56) References Cited

U.S. PATENT DOCUMENTS

| | | | | |
|---|---|---|---|---|
| 2007/0110322 | A1* | 5/2007 | Yuille | G06K 9/325 382/227 |
| 2008/0247655 | A1* | 10/2008 | Yano | H04N 1/41 382/232 |
| 2010/0171999 | A1* | 7/2010 | Namikata | G06K 9/00456 358/530 |
| 2011/0202832 | A1* | 8/2011 | Lum | G06F 17/211 715/249 |
| 2012/0072013 | A1* | 3/2012 | Hamamura | G06K 9/346 700/224 |
| 2014/0160510 | A1* | 6/2014 | Kawasaki | G06F 3/121 358/1.14 |
| 2015/0146020 | A1* | 5/2015 | Imaizumi | G06K 9/22 348/207.1 |
| 2015/0220778 | A1* | 8/2015 | Macciola | G06K 9/00442 382/112 |
| 2015/0234788 | A1* | 8/2015 | Lum | G06F 17/211 715/249 |
| 2016/0004682 | A1* | 1/2016 | Nakatsuka | G06F 17/245 715/228 |
| 2016/0005202 | A1 | 1/2016 | Yamazaki et al. | |
| 2016/0005203 | A1* | 1/2016 | Kawasaki | G06T 11/60 382/163 |
| 2016/0203625 | A1* | 7/2016 | Khan | G06T 11/60 345/636 |

OTHER PUBLICATIONS

Bassil et al, OCR Context-Sensitive Error Correction Based on Google Web 1T 5-Gram Data Set, American Journal of Scientific Research, ISSN 1450-223X Issue 50 (2012), pp. 14-25 (Year: 2012).*

Kissos, Ido, and Nachum Dershowitz. "Ocr error correction using character correction and feature-based word classification." Document Analysis Systems (DAS), 2016 12th IAPR Workshop on. IEEE, 2016. (Year: 2016).*

Dalitz, Christoph, and René Baston. "Optical Character Recognition with the Gamera Frannework." Doc. Image Analysis with the Gamera Framework (2009): 53-65. (Year: 2009).*

* cited by examiner

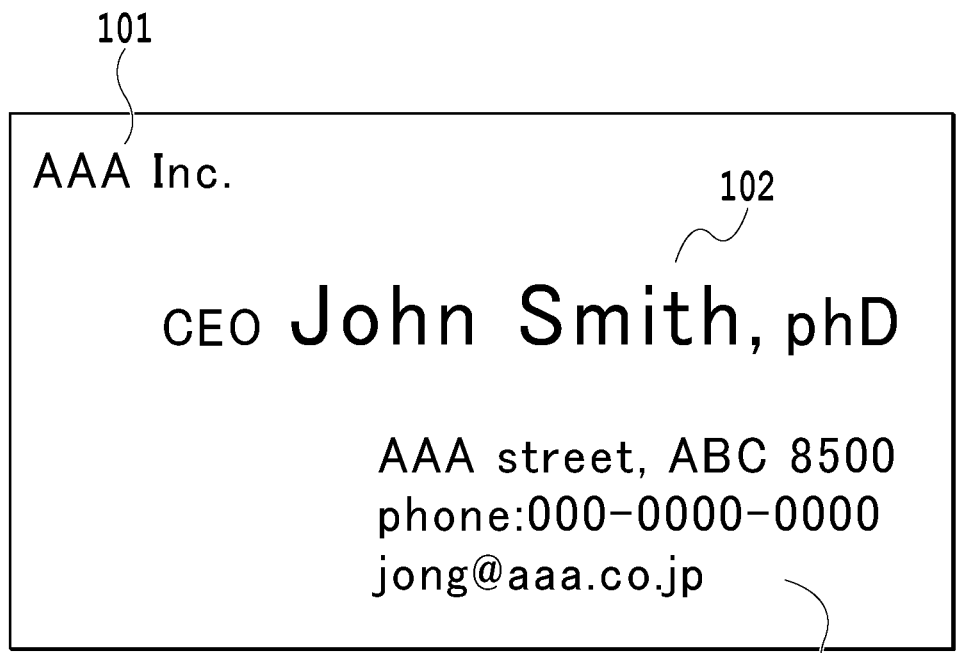
FIG.1A
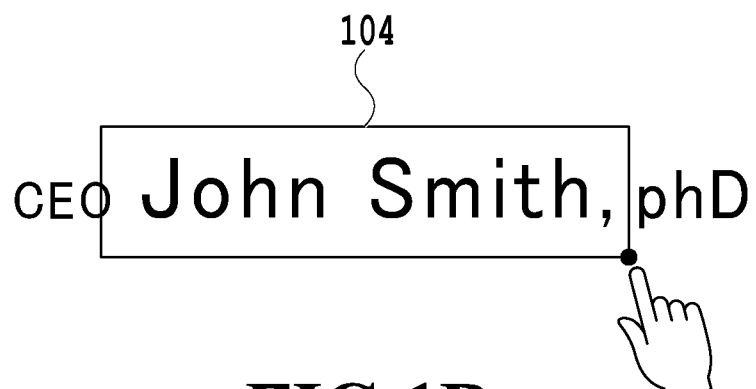
FIG.1B
SELECTED CHARACTERS
⎵John Smith,
FIG.1C

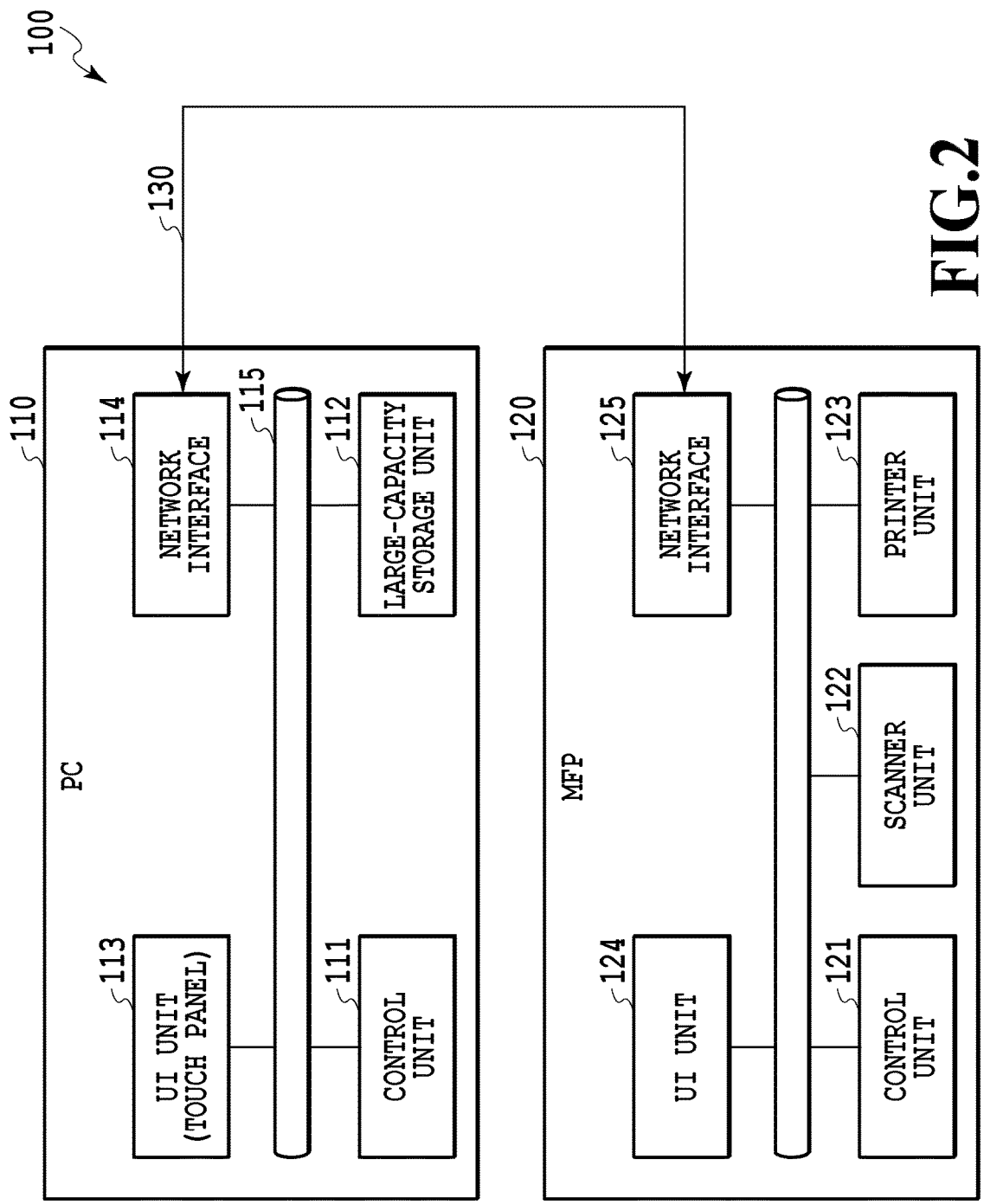

CEO John Smith, phD
FIG.4A

CEO John Smith, phD
FIG.4B

CEO John Smith, phD
FIG.4C

CEO John Smith, phD
FIG.4D

CEO John Smith, phD
FIG.4E

| ID | CHARACTER RECOGNITION RESULTS | TOP-LEFT COORDINATES | BOTTOM-RIGHT COORDINATES | COORDINATES AFTER CHANGE ||
|---|---|---|---|---|---|
| | | | | TOP-LEFT | BOTTOM-RIGHT |
| 1 | "C" | (10, 32) | (33, 66) | | |
| 2 | "E" | (38, 33) | (58, 65) | | |
| 3 | "O" | (62, 32) | (92, 66) | TOP-LEFT | BOTTOM-RIGHT |
| 4 | " " | (93, 32) | (111, 66) | (77, 32) | (122, 66) |
| 5 | "J" | (112, 11) | (132, 66) | | |
| 6 | "o" | (143, 24) | (180, 66) | | |
| 7 | "h" | (189, 7) | (223, 66) | | |
| 8 | "n" | (234, 24) | (267, 66) | TOP-LEFT | BOTTOM-RIGHT |
| 9 | " " | (267, 24) | (293, 66) | (250, 24) | (311, 66) |
| 10 | "S" | (294, 10) | (328, 66) | | |
| 11 | "m" | (336, 24) | (393, 66) | | |
| 12 | "i" | (403, 10) | (412, 66) | | |
| 13 | "t" | (419, 15) | (444, 66) | | |
| 14 | "h" | (452, 7) | (485, 66) | TOP-LEFT | BOTTOM-RIGHT |
| 15 | "," | (459, 56) | (468, 73) | (468, 56) | (541, 73) |
| 16 | "p" | (526, 33) | (556, 74) | | |
| 17 | "h" | (560, 17) | (591, 64) | | |
| 18 | "D" | (594, 18) | (624, 65) | | |

FIG.5

APPARATUS, METHOD AND NON-TRANSITORY STORAGE MEDIUM FOR CHANGING POSITION COORDINATES OF A CHARACTER AREA STORED IN ASSOCIATION WITH A CHARACTER RECOGNITION RESULT

BACKGROUND OF THE INVENTION

Field of the Invention

The present invention relates to a character recognition technique for an image including a character.

Description of the Related Art

There is a technique to perform character recognition processing (OCR processing) for a character area within an image including a character, to take out only an arbitrary character string by selecting a desired range from the results of the character recognition processing, and to turn the character string into electronic data. Due to this, it is made possible to register a specific character string, such as a name and an address, in an image in an address book and print the character string. Then, as the technique to select a specific range from a character area within an image, there is a method of selecting a desired range by an operation with a finger on a touch panel or a method of selecting a desired range by recognizing movement of a finger by a camera on an operation screen projected by a projector.

With the method of specifying a range by the operation with a finger or the like on a touch panel or the method of specifying a range by recognizing movement of a fingertip by a camera described above, it is difficult to specify a range in detail, and therefore, there is such a problem that a character and a symbol, such as a punctuation mark, located near the boundary of the range desired to be selected are also included in the selected range. FIG. 1A to FIG. 1C are diagrams showing the way only a name portion is selected by a finger from the character recognition results of a calling card image obtained by scanning a calling card (a business card). FIG. 1A shows an image (calling card image) obtained by optically reading a calling card and FIG. 1B shows the way the range of the portion of the name "John A. Smith" is specified and selected by a finger from the character recognition results. In this example of horizontal writing, the range is selected with the space and the comma located near the boundary of a rectangle 104 enclosing the name being included. As a result of this, the character string that is selected actually will be that as shown in FIG. 1C.

As the technique to adjust the position of a punctuation mark or the like in the character recognition results, for example, there is a technique disclosed in Japanese Patent Laid-Open No. 2015-103114. Japanese Patent Laid-Open No. 2015-103114 has disclosed the technique to, in the case where character recognition processing is performed for an image of a document to acquire text data and the acquired text data is embedded within the original image, perform position adjustment so that the position of the text data coincides with the position of the corresponding character image. According to Japanese Patent Laid-Open No. 2015-103114, even in the case where a space, a punctuation mark, etc., exist, it is possible to perform adjustment so that the position of the text data to be embedded and the position of the character image corresponding thereto coincide with each other. However, in the case where an exact range cannot be specified by selecting text data to be embedded by a user using his/her fingertip or the like, it is not possible to perform adjustment itself. Consequently, an object of the present invention is to prevent a symbol, such as a space, located at a position adjacent to a desired character string from being included in a selected range unintendedly in the case where a user extracts a desired character string by specifying a range using his/her finger or the like on an image including a character.

SUMMARY OF THE INVENTION

The apparatus according to the present invention is an apparatus executing: identifying a character area corresponding to each character included in an image; performing character recognition processing for each of the identified character areas; determining a specific character from results of the character recognition processing; extending the character area corresponding to the determined specific character; displaying the image; acquiring a range selected by a user in the displayed image; and outputting character recognition results corresponding to a plurality of character areas included in the selected range.

Further features of the present invention will become apparent from the following description of exemplary embodiments (with reference to the attached drawings).

BRIEF DESCRIPTION OF THE DRAWINGS

FIG. 1A to FIG. 1C are diagrams showing the way only a name portion is selected by a finger from character recognition results of a calling card image;

FIG. 2 is a diagram showing a configuration example of an information processing system;

FIG. 4A shows an area corresponding to a name portion including his/her title of a text attribute area of a calling card image;

FIG. 4B shows results of performing area recognition for each character for the text attribute area;

FIG. 4C is a diagram showing an individual character-based area after a change;

FIG. 4D is a diagram showing an example of a range selected by a user;

FIG. 4E is a diagram showing an individual character-based area after a change of each adjacent character of a specific character;

FIG. 5 is an example of a character recognition result table;

DESCRIPTION OF THE EMBODIMENTS

Figure 3:
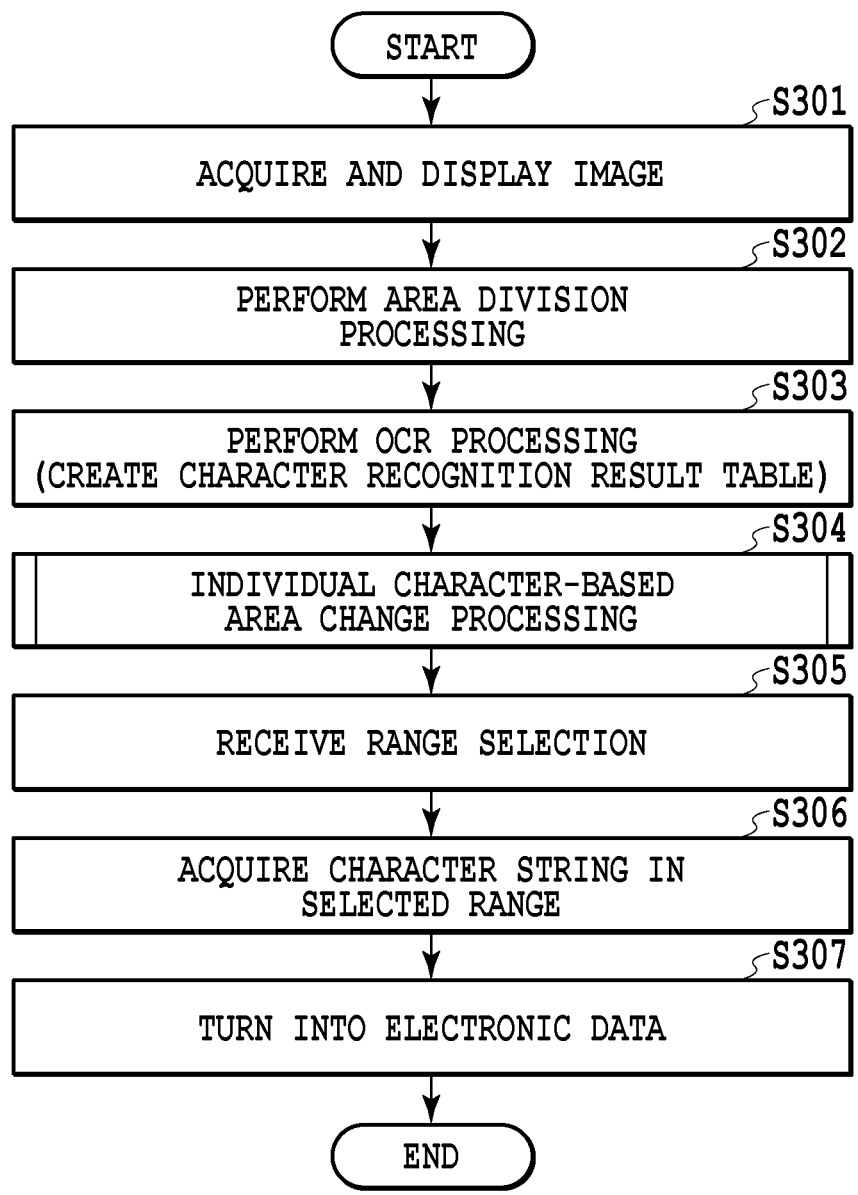
FIG. 3 is a flowchart showing a flow of processing until an arbitrary character string is selected from character recognition results and turned into electronic data.

Hereinafter, with reference to the attached drawings, the present invention is explained in detail in accordance with preferred embodiments. Configurations shown in the following embodiments are merely exemplary and the present invention is not limited to the configurations shown schematically.

[First Embodiment]

For example, in the case where it is desired to extract only a name portion from a calling card and to turn the name portion into electronic data (see FIG. 1A to FIG. 1C described previously), a space and a comma located before and after the name are not necessary. However, in the case where a range is selected by an operation using a finger on a touch panel or in the case where a range is selected by recognizing movement of a fingertip by a camera, it is difficult to specify a range in detail, and there is a possibility that a space, a comma, etc., in contact with the boundary of a desired character string portion are selected unintendedly. In the present embodiment, the size of an area allocated to each character is adjusted so that an unintended symbol, such as a space and a comma, becomes less apt to be included at the time of the operation to select a range as described above. In the following, detailed explanation is given.

FIG. 2 is a diagram showing a configuration example of an information processing system according to the present embodiment. An information processing system 100 shown in FIG. 2 includes a PC 110, which is an information processing apparatus, and an MFP (Multi Function Peripheral) 120 having a plurality of functions, such as a function as a scanner, and has a configuration in which both are connected via a network 130. The network 130 is, for example, a LAN, a WAN, etc.

The PC 110 includes a control unit 111, a large-capacity storage unit 112, a UI unit 113, and a network interface 114. The control unit 111 includes a CPU and a memory and is in charge of control of the entire PC 110. Various kinds of processing, including processing to select an arbitrary character string from character recognition results and to turn the character string into electronic data, are implemented by the CPU reading and developing programs stored in a ROM or the like onto a RAM and executing the programs. The network interface 114 is an interface for communicating various kinds of data with the MFP 120 via the network 130. The large-capacity storage unit 112 includes, for example, a hard disk drive and a flash memory and stores data of a scanned image or the like received from the MFP 120, in addition to an OS and programs. The UI unit 113 is a user interface for a user to perform an input operation and has a touch panel function capable of making the range selection described previously. Further, the UI unit 113 may include a keyboard, a mouse, etc. Then, each of the units described above is connected to one another via a bus 115. The configuration of the UI unit 113 is not limited to that described above. For example, it may also be possible to receive an input operation of a user, including the range selection described previously, by projecting an image by a projector and photographing the position of a fingertip with respect to the projected image by a camera to recognize the movement of the fingertip.

The MFP 120 includes a control unit 121, a scanner unit 122, a printer unit 123, a UI unit 124, and a network interface 125. The control unit 121 centralizedly controls each unit of the MFP 120. The UI unit 124 includes buttons for a user to perform various operations and a display unit (e.g., LCD) configured to display various kinds of information. The scanner unit 122 optically reads a document (including calling card and postcard) that is set on a read table, not shown schematically, and generates image data (scanned image data). The generated scanned image data is sent to the PC 110 by the control unit 121 via the network interface 125. The printer unit 123 prints and outputs various kinds of image data processed by the control unit 101.

FIG. 3 is a flowchart showing a flow of processing in the PC 110 until character recognition processing is performed for an image including a character string and an arbitrary character string is selected from the obtained character recognition results, and then the character string is turned into electronic data. In the present embodiment, explanation is given by taking the case where a name portion is extracted from an image of a horizontally written calling card and the name is turned into electronic data as an example. The calling card image may be a captured image obtained by photographing a calling card by a camera, in addition to a scanned image obtained by reading a name portion by the scanner unit 122 of the MFP 120. Further, here, explanation is given by taking an image of a horizontally written calling card as an example, but the processing-target image may be an image of a vertically written calling card or may include an element (e.g., graphics and photo) other than a character.

At step 301, data of a processing-target calling card image (see FIG. 1A) is acquired and displayed on the touch panel of the UI unit 113. Then, at step 302 that follows, area division processing is performed for the calling card image. The area division means to divide objects included in the image into areas in accordance with the attribute, such as text, photo, graphics, and table. The processing-target image is not limited to a calling card image and there may be various document images. Because of this, the area division processing is necessary in order to specify an area including a character, which is the target of OCR processing, to be described later. Details of the area division processing are not essential to the present invention, and therefore, explanation is omitted. To the area with a text attribute of the areas divided by the area division processing, an ID for each area is allocated. This is to make it possible to determine from which text attribute area the character recognition results are acquired at the time of acquiring the character recognition results, to be explained later, because the OCR processing is performed for each text attribute area. The image including a character string may be a color image, a multivalued image, such as a gray image, and a binary image, such as a monochrome image, and in this case, it may be possible to use the area division processing corresponding to an input image.

At step 303, the OCR processing is performed for the text attribute area and a character recognition result table is generated. In the OCR processing, first, for the text attribute area, area recognition for each character to identify each individual character is performed. Here, it is assumed that that the area for each character is a rectangle that circumscribes a target character and represented by the coordinates of the top-left corner (top-left coordinates) of the rectangle and the coordinates of the bottom-right corner (bottom-right coordinates). FIG. 4A shows an area 102 corresponding to a name portion including his/her title of text attribute areas 101 to 103 extracted by the area division processing for the calling card image in FIG. 1A. FIG. 4B shows the results of performing the area recognition for each character for the text attribute area 102. As shown in FIG. 4B, a rectangle corresponding to each individual character is recognized as an independent area (hereinafter, called "individual character-based area"). Then, it is assumed that an id to identify each individual character-based area is allocated in the order from the individual character-based area whose value of the x-coordinate of the top-right corner is the smallest for each individual character-based area. This id allocation order is an example and the order is not limited to this. Then, for each individual character-based area to which id is allocated, character recognition to determine which kind of character each character is and to allocate a corresponding character code to the character is performed. The character recognition results are stored in a character recognition result table for each individual character-based area in association with id. FIG. 5 is a character recognition result table created for the text attribute area 102 in FIG. 4A. The results of performing the character recognition for each individual character-based area are stored along with id and its position coordinates (it is assumed that the top-left corner of a rectangular area, not shown schematically, which encloses the whole of FIG. 4A is the origin). For example, the character recognition results of the character area with id: 1 whose position is specified by the coordinates (10, 32) of the top-left corner and the coordinates (33, 66) of the bottom-right corner is the letter "c" of the English alphabet and the character code corresponding to "c" is stored. In the character code allocated to each character, information on (elements of) the kind of font, the font size, the style, and the color is included. In this manner, the character recognition result table is created for all the text attribute areas.

At step 304, based on the character recognition result table created at step 303, processing to change the individual character-based area for a specific character determined in advance is performed. By this change processing, a symbol that is not intended, such a space and a comma, which is in contact with the boundary of a character string portion desired to be selected becomes less apt to be included at the time of the operation of range selection, to be described later. In the following, details of individual character-based area change processing are explained in detail.

Figure 6:
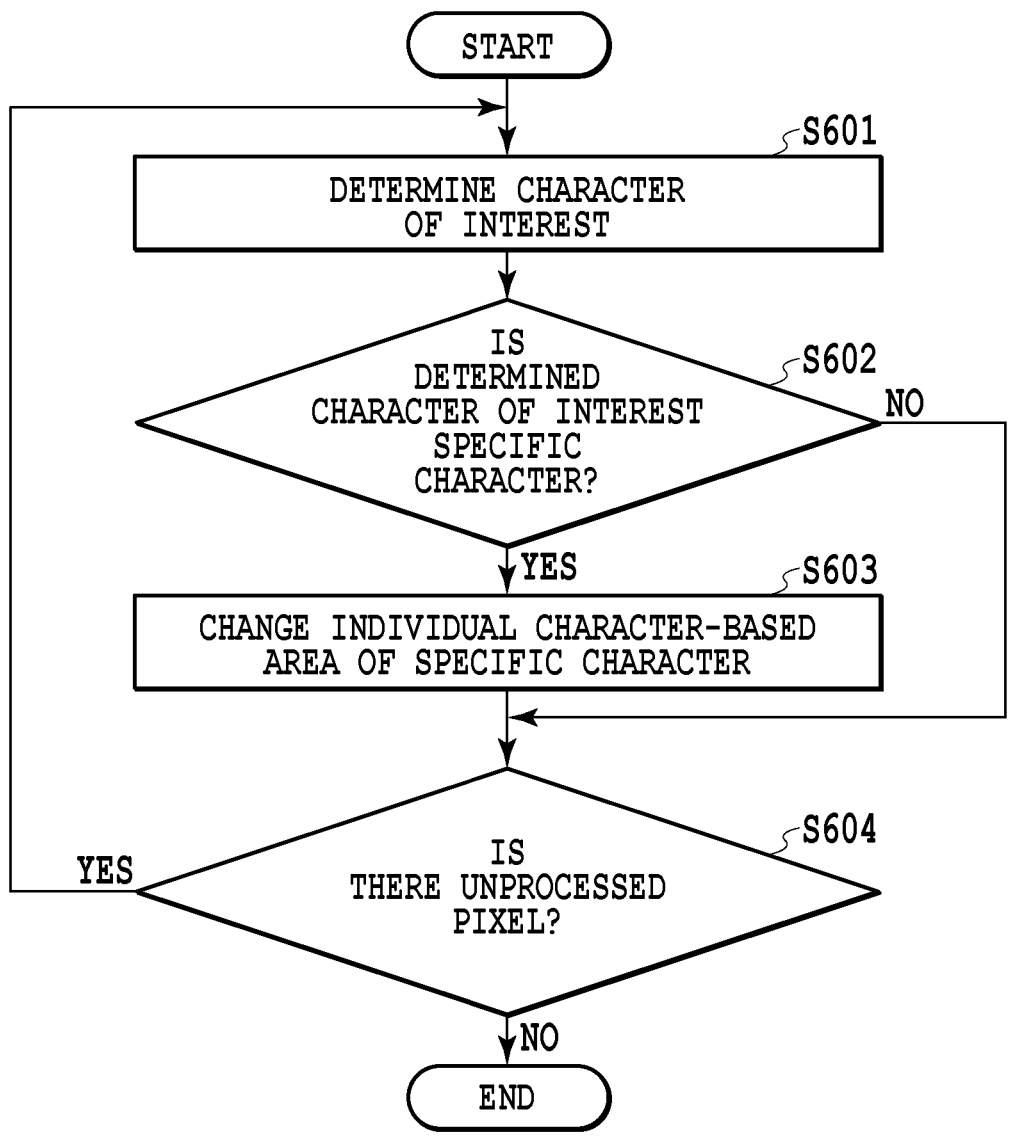
FIG. 6 is a flowchart showing details of individual character-based area change processing according to a first embodiment.

FIG. 6 is a flowchart showing details of the individual character-based area change processing according to the present embodiment. At step 601, a character of interest is determined from the character recognition results stored in the character recognition result table. At step 602 that follows, whether the determined character of interest is a specific character is determined. Here, the concept of a specific character is a concept including a symbol that serves as a delimiter at the time of range selection, such as a comma, a period, and a space (blank character), and is a concept wider than that of a "character" in the general meaning. In the example of the character recognition result table in FIG. 5, it is assumed that "space" with id: 4 and id: 9 and "comma" with id: 15 are each set as a specific character. It may also be possible to set a specific character with different contents in accordance with the kind of a processing-target document (e.g., calling card, FAX image, etc.). Further, it may also be possible to set a specific character with different contents in accordance with an item that is extracted from within an image, such as a name and an address. It is sufficient for a user to set a specific character in advance by taking into consideration the above-described point and to save information specifying the set specific character in the large-capacity storage unit 112. In the case where the results of the determination indicate that the character of interest is a specific character, the processing proceeds to step 603 and then the individual character-based area is changed. On the other hand, in the case where the character of interest is not a specific character, the individual character-based area of the character of interest is not changed and the processing proceeds to step 604.

At step 603, the individual character-based area of the character of interest determined to be a specific character is changed so as to become less apt to be included at the time of range selection, to be described later. Specifically, the individual character-based area of a specific character is extended so as to overlap the individual character-based area of a character adjacent to the specific character. In the present embodiment in which characters are written horizontally, the x-coordinate specifying the width of the specific character is increased up to the center of the x-coordinate of a character adjacent to the specific character. For example, in the case where the specific character is "space" (id: 4), the x-coordinate of the individual character-based area thereof is increased up to the center of the x-coordinate in the individual character-based area of "O (id: 3)" and up to the center of the x-coordinate in the individual character-based area of "J (id: 5). Here, the center of the x-coordinate of "O (id: 3)" has a coordinate of "77 and the center of the x-coordinate of "J (id: 5)" has a coordinate of "122", and therefore, the individual character-based area of "space (id: 4)" is changed so that the top-left coordinates are (77, 32) and the bottom-right coordinates are (126, 66). Similarly, the top-left coordinates of the individual character-based area of "space" with id: 9 after the change are changed to (250, 24) and the bottom-right coordinates to "(311, 66), and the top-left coordinates of the individual character-based area of "comma" with id: 15 after the change are changed to (468, 56) and the bottom-right coordinates to "(541, 73). Then, the position coordinates of the individual character-based area after the change are reflected in the character recognition result table. FIG. 4C is a diagram in which the individual character-based areas with id: 4, 9, and 15 after the change are indicated by thick line rectangles. In the character recognition result table in FIG. 5, for convenience of explanation, the position coordinates of the individual character-based area after the change are shown individually, but it may also be possible to simply update (overwrite) the position coordinates.

At step 604, whether the processing has been completed for all the character recognition results stored in the character recognition result table is determined. In the case where there is an unprocessed character, the processing returns to step 601 and the processing is continued by determining the next character to be a character of interest. On the other hand, in the case where the processing has been completed for all the character recognition results, the present processing is terminated.

The above is the contents of the individual character-based area change processing and this processing is repeated the number of times corresponding to the number of character recognition result tables. Explanation is returned to the flowchart in FIG. 3.

At step 305, range selection by using the finger or the like of a user him/herself in order to extract an arbitrary character string from the character recognition results for the processing-target text attribute area is received. In the present embodiment, it is assumed that an arbitrary range is selected by the top-right coordinates and the bottom-left coordinates of a rectangle drawn so as to enclose a desired character string portion. Specifically, in the case where a range is specified by using a finger on the touch panel, a rectangle is drawn by a line connecting from the position at which the touch is started (detected) to the position at which the touch is terminated and a selected range is specified by the top-right coordinates and the bottom-left coordinates of the drawn rectangle. Further, in the case where a range is specified by using a mouse, a rectangle is drawn by a line connecting from the position at which the click is started to the position at which the click is terminated and a selected range is specified by the top-right coordinates and the bottom-left coordinates of the drawn rectangle. The method of range selection is not limited to that described above and another method may be used. FIG. 4D is a diagram showing an example of a range selected by the above-described method by a broken line and it is assumed that the position coordinates of the top-left of the selected range are (80, 5) and those of the bottom-right are (470, 80).

At step 306, a character string is acquired based on the received range selection. Specifically, only the characters whose individual character-based area is full included within the selected rectangular range are taken out in the order of id by referring to the character recognition result table. In the example shown in FIGS. 4A to 4D, the individual character-based areas from id: 5 to id: 14 are included in the selected rectangular area, and therefore, the character string "John Smith" obtained by arranging the character recognition results of the ten individual character-based areas in the order of id is taken out. In the stage immediately after the OCR processing, the individual character-based areas of "space" with id: 4 and "comma" with id: 15 are also included in the selected range indicated by the broken line in FIG. 4D (see FIG. 5). Because of this, it is natural for the character string "John Smith," in the state where the space and the comma located before and after the character string are included to be extracted. From this, it is known that the unnecessary space and comma located before and after the desired character string are no longer included in the selected range by the change processing of the individual character-based area.

At step 307, the character string extracted from the selected range is turned into electronic data. Then, the processing, such as processing to register the character string in an address book and processing to print the character string, is implemented by using the electronized character string data.

The above is the contents of the processing until character recognition processing is performed for an image including a character and an arbitrary character string is selected from the obtained character recognition results, and then the character string is turned into electronic data. It is possible to apply a publicly known method to the area division processing (step 302) and the recognition processing and the OCR processing of an individual character-based area (step 303) and details thereof are not essential to the present invention, and therefore, explanation is omitted.

In the present embodiment, the example is explained in which the individual character-based area is change by increasing the x-coordinate specifying the width of a specific character up to the center of the x-coordinate of a character adjacent to the specific character, but the change method is not limited to this. For example, in FIGS. 4A to 4E described previously, it may also be possible to change the individual character-based area of "space (id: 4)" into a minimum rectangular area that includes the characters "o (id: 3)" and "J (id: 5)" on both sides thereof. In this case, the top-left coordinates of id: 4 are changed to (62, 32) and the bottom-right coordinates to (132, 66), respectively, and only in the case where both the characters with id: 3 and id: 5 are selected simultaneously, the specific character with id: 4 is selected.

Further, it may also be possible to actually display the rectangle that encloses each individual character shown in FIG. 4B on the UI screen. Furthermore, it may also be possible to actually display the individual character-based area after the position coordinates are changed by a thick line rectangle on the UI screen as shown in FIG. 4C. At this time, it is needless to say that the kind of line is arbitrary.

As above, according to the present embodiment, in the case where a user selects an arbitrary range by using his/her finger or the like on an image, control is performed so that an unnecessary character, such as a space and a comma, becomes less apt to be selected. Due to this, it is possible for a user to easily select only a desired character string.

[Second Embodiment]

In the first embodiment, the aspect is explained in which the size of the individual character-based area of a specific character is changed so that an unnecessary character (specific character), such as a space and a comma, which tends to be located in the vicinity of a desired character string, becomes less apt to be included at the time of range selection. However, in the case where the specific character is small or in the case where the interval between characters is narrow, it is still considered that a range including another character adjacent to the specific character is selected unintendedly even by extending the individual character-based area of the specific character itself. For example, in the example of the calling card image described previously, in the case where it is desired to select only the character string "John Smith", there is a possibility that "o John Smith" including "o" located before "J" with a space being sandwiched in between is selected. Consequently, an aspect is explained as a second embodiment in which the individual character-based area is changed so that another character adjacent to the specific character also becomes less apt to be included in the selected range. Explanation of the portions in common to those of the first embodiment is omitted or simplified and in the following, a different point is explained mainly.

Figure 7:
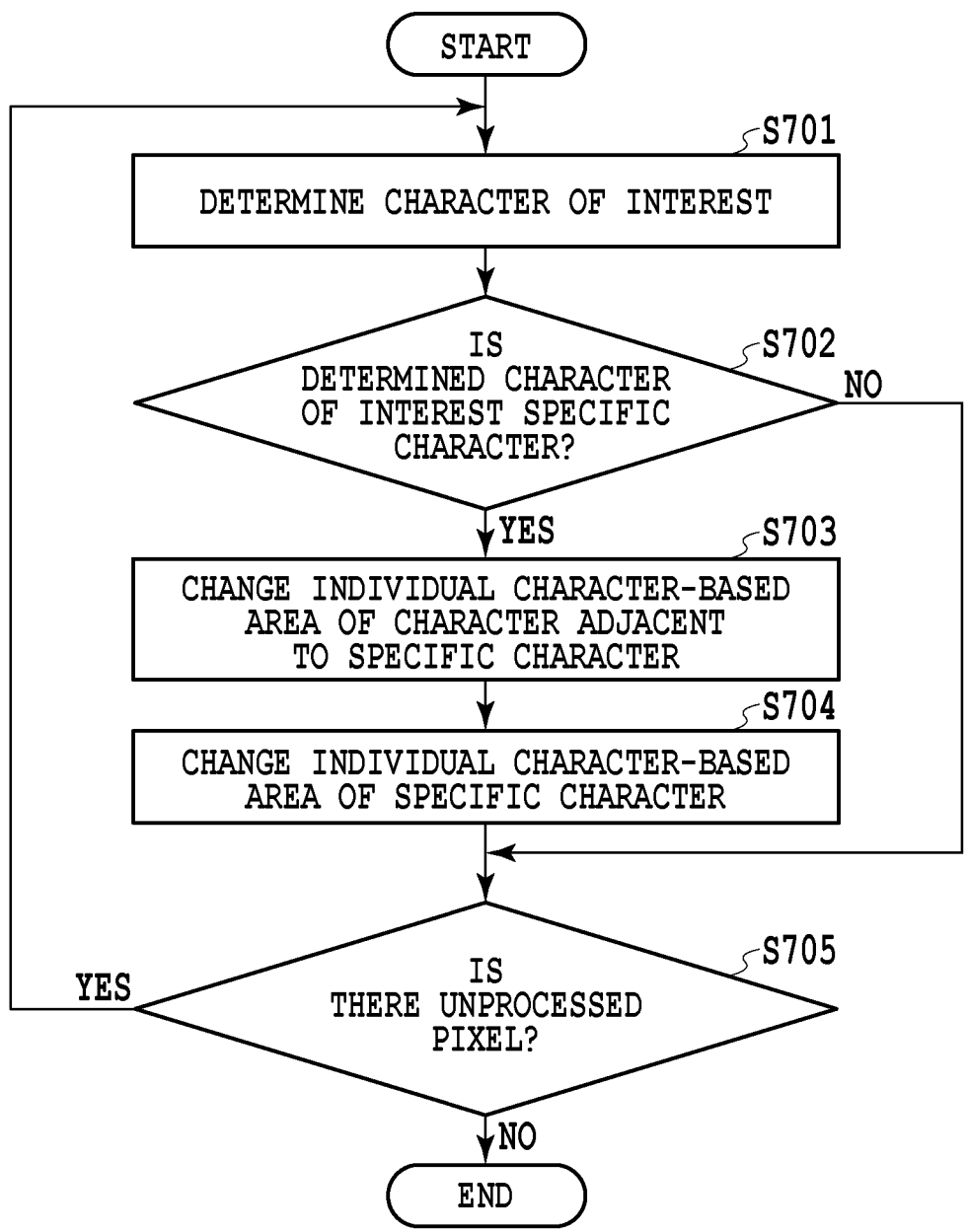
FIG. 7 is a flowchart showing details of individual character-based area change processing according to a second embodiment.

FIG. 7 is a flowchart showing details of individual character-based area change processing according to the present embodiment. Steps 701 and 702 correspond to steps 601 and 602, respectively, in the flow in FIG. 6. That is, a character of interest is determined from the character recognition results stored in the character recognition result table (step 701) and whether the determined character of interest is a specific character is determined (step 702).

At step 703, the individual character-based area of the character (hereinafter, adjacent character) adjacent to the character determined to be a specific character is changed. Specifically, processing to extend the size of the individual character-based area of the adjacent character by a predetermined ratio in the direction opposite to that of the specific character is performed. In the present embodiment of horizontal writing, the x-coordinate specifying the width of the individual character-based area of the adjacent character is shifted by a predetermined ratio (here, 20%) in the direction opposite to that of the specific character. For example, in the example of the calling card image described previously, the width of the individual character-based area of "O (id: 3)" located on the left of "space (id: 4)", which is the specific character, is "30 (=92−62)". Consequently, the x-coordinate of the individual character-based area of "O (id: 3)" is shifted by "6", which is the width corresponding to 20% of the width 30, in the leftward direction, which is opposite to the direction of the specific character, and thus the top-left coordinates are changed to (56, 32). Further, the width of the character "J (id: 5)" located on the right of "space (id: 4)" is "20 (=132−112)". Consequently, the x-coordinate of the individual character-based area of "J (id: 5)" is shifted by "4", which is the width corresponding to 20% of the width 20, in the rightward direction, which is opposite to the direction of the specific character, and thus the bottom-right coordinates are changed to (136, 66). The change processing of the individual character-based area such as this is performed for the adjacent characters of all the specific characters.

Then, the position coordinates of the individual character-based area after the change are reflected in the character recognition result table. In FIG. 4E, the individual character-based area after the change of each adjacent character of the above-described three specific characters (id: 4, 9, 15) is shown by the broken line rectangle. By the processing such as this, even in the case where the specific character is small or the distance between characters is short, it becomes less apt to happen that the character adjacent to a specific character is selected unintendedly.

The subsequent steps 704 and 705 correspond to steps 603 and 604, respectively, in the flow in FIG. 6. That is, the individual character-based area of the character of interest determined to be a specific character is changed so as to become less apt to be included in the selected range at the time of area selection (step 704). Then, whether the processing has been completed for all the character recognition results stored in the character recognition result table is determined (step 705). In the case where the results of the determination indicate that there is an unprocessed character, the processing returns to step 701 and the processing is continued by taking the next character to be the character of interest, and in the case where the processing has been completed for all the character recognition results, the present processing is terminated. The above is the contents of the individual character-based area change processing in the present embodiment.

According to the present embodiment, the individual character-based area is changed not only for the specific character but also for the character adjacent thereto. Due to this, it is possible to prevent another character adjacent to the specific character from being included in the selected range unintendedly in the case where the specific character is small or in the case where the interval between characters is narrow.

[Third Embodiment]

In the case where a noun, such as a name and an address, is selected from a processing-target image, in many case, the noun group of the same kind is written by the same font type, font size, style, and color. That is, in the case where the character characteristics, such as the font type, the font size, the style, and the color, are different between characters adjacent to each other, the possibility that the characters are different kinds of character is strong. Consequently, an aspect is explained as a third embodiment in which in the case where the characteristics of characters adjacent to each other with a specific character being sandwiched in between are different, the degree of extension of the individual character-based area of the adjacent character located on the opposite side of a desired character string with the specific character being sandwiched in between is increased so that the adjacent character becomes less apt to be included in the selected range. Explanation of the portions in common to those of the second embodiment is omitted or simplified and in the following, a different point is explained mainly.

Figure 8:
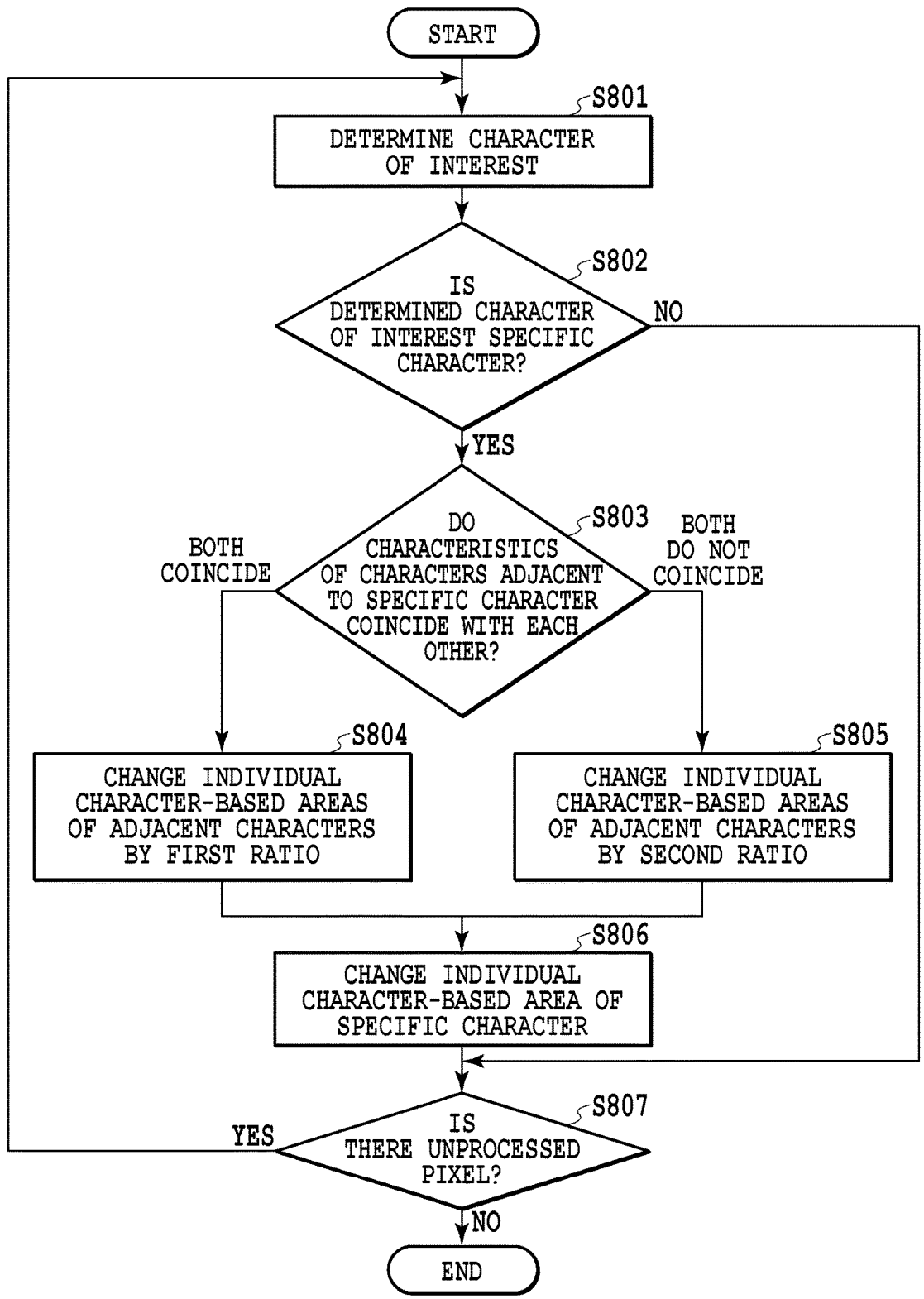
FIG. 8 is a flowchart showing details of individual character-based area change processing according to a third embodiment.

FIG. 8 is a flowchart showing details of individual character-based area change processing according to the present embodiment. Steps 801 and 802 correspond to steps 701 and 702, respectively, in the flow in FIG. 7. That is, a character of interest is determined from the character recognition results stored in the character recognition result table (step 801) and whether the determined character of interest is a specific character is determined (step 802).

At step 803, whether the characteristics of characters adjacent to each other with the character determined to be a specific character being sandwiched in between coincide with each other is determined. Here, the characteristics of a character refer to the font type, the font size, the style, the color, etc., which will be normally common in the case where the kind of character is the same. For the determination of the character characteristics, an already-known method may be used. For example, in the case of the font type and the style, it is possible to perform the determination by collating a database of images with font types and styles prepared in advance with an image within the rectangle of the individual character-based area. In the case of the font size, it is possible to perform the determination by estimating the font size from the size of the rectangle of the individual character-based area and by making a comparison. In the case of the color, it is possible to perform the determination by finding an average of RGB values of an aggregation of a plurality of pixels of the input image, which corresponds to an aggregation of a plurality of pixels determined to be a character, within the rectangle of the individual character-based area and by comparing the average values that are found. In this manner, for example, in the case of the calling card image described previously, it is determined that the character characteristics are different between the characters "O (id: 3)" and "J (id: 5)" adjacent to each other with "space (id: 4)", which is a specific character, being sandwiched in between because the character sizes are different from each other. In the case where the results of the determination indicate that the characters adjacent to each other with a specific character being sandwiched in between have the same characteristics (the characteristics coincide with each other), the processing proceeds to step 804. On the other hand, in the case where the characters adjacent to each other with a specific character being sandwiched in between do not have the same characteristics (the characteristics do not coincide with each other), the processing proceeds to step 805.

At step 804, the size (here, width) of the individual character-based area of the adjacent character is extended by a predetermined ratio in the direction opposite to that of the specific character. At this step in the case where the characteristics of the adjacent characters coincide with each other, the processing to extend the width of the individual character-based area is performed by the same ratio (first ratio: e.g., 20%) as that at step 704 in the flow in FIG. 7 of the second embodiment.

At step 805, the processing to extend the width of the individual character-based area of the adjacent character is performed by a ratio (second ratio: e.g., 50%) greater than that at step 804. For example, for the adjacent characters "O (id: 13)" and "J (id: 5)" whose character sizes are different from each other described previously, the width of each individual character-based area is extended by 50% in the direction opposite to that of the specific character. For example, the width of "O (id: 3)" located on the left of the specific character is "30", and therefore, the x-coordinate is shifted by "15", which is the width corresponding to 50% of the width "30", in the leftward direction opposite to the direction of the specific character and the top-left coordinates are changed to (47, 32). Further, the width of "J (id: 5)" located on the right of the specific character is "20 (=132-112), and therefore, the x-coordinate is shifted by "10", which is the width corresponding to 50% of the width "20", in the rightward direction opposite to the direction of the specific character and the bottom-right coordinates are changed to (142, 66). The change processing of the individual character-based area such as this is performed for the adjacent characters of all the specific characters. Then, the position coordinates of the individual character-based area after the change are reflected in the character recognition result table. Each piece of processing at the subsequent steps 806 and 807 is the same as that in the second embodiment, and therefore, explanation is omitted.

In the present embodiment, whether the characteristics of characters adjacent to a specific character coincide with each other is determined and in the case where the character characteristics do not coincide with each other, the degree of extension of the individual character-based area of the character adjacent to a specific character is increased. Due to this, the unintended character on the opposite side with the specific character being sandwiched in between becomes less apt to be selected.

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, in the case where a user extracts a desired character string by specifying a range by using a finger or the like of him/herself on an image including a character, it is possible to prevent a symbol, such as a space, located at the position adjacent to the desired character string from being included unintendedly in the selected range.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-036188 filed Feb. 26, 2016, which is hereby incorporated by reference wherein in its entirety.

What is claimed is:
1. An apparatus comprising:
a memory; and
at least one processor in communication with the memory, wherein the at least one processor executes:
identifying a character area corresponding to each character included in an image;
performing character recognition processing for each of the identified character areas to obtain character recognition results;
storing the obtained character recognition results in association with position coordinates of each of the character areas;
determining a specific character from the stored character recognition results;
changing position coordinates of the character area being stored in association with the determined specific character to extend the character area corresponding to the determined specific character;
displaying the image on a display;
acquiring a range selected by a user in the image displayed on the display; and
outputting, based on the results of the character recognition processing stored in association with the position coordinates of each of the characters after the changing, character recognition results corresponding to a plurality of character areas included in the selected range.

2. The apparatus according to claim 1, wherein the position coordinates of the character area being stored in association with the determined specific character is changed so that the character area corresponding to the determined specific character is extended so as to overlap at least part of a character area corresponding to a character adjacent to the determined specific character.

3. The apparatus according to claim 2, further comprising:
a storage configured to store information specifying the specific character, wherein
the specific character is determined from the stored character recognition results by using information stored in the storage.

4. The apparatus according to claim 1, wherein
the position coordinates of the character area being stored in association with the determined specific character is changed so that the character area corresponding to the determined specific character is extended up to the center of an adjacent character area corresponding to a character adjacent to the determined specific character.

5. The apparatus according to claim 1, wherein
the at least one processor further executes: changing position coordinates of an adjacent character area stored in association with a character adjacent to the determined specific character to extend the adjacent character area by a predetermined ratio in a direction away from the determined specific character.

6. The apparatus according to claim 5, wherein
the at least one processor further executes: determining whether characteristics of characters adjacent to each side of the determined specific character coincide with each other, wherein, in a case where the characteristics do not coincide with each other, a degree of extension of the adjacent character areas stored in association with characters adjacent to each side of the determined specific character is increased than that in a case where the characteristics coincide with each other.

7. The apparatus according to claim 6, wherein
the character recognition results are obtained as character codes,
wherein, in a case where elements included in character codes of the characters adjacent to each side of the determined specific character are different, it is determined that the characteristics do not coincide with each other.

8. The apparatus according to claim 7, wherein
the character code obtained by the character recognition processing includes elements of a kind of font, a font size, a style, and a color as the characteristics for each character for which the character recognition processing has been performed, and
wherein it is determined that characteristics do not coincide with each other in a case where at least one element is different.

9. The apparatus according to claim 1, wherein
the character area is a rectangle circumscribing each individual character included in the image.

10. The apparatus according to claim 1, wherein the at least one processor further executes:
dividing the image into areas in accordance with attributes to specify an area with a text attribute, wherein
the character recognition processing is performed for each character image included in the specified area with the text attribute.

11. The apparatus according to claim 1, wherein
the specific character includes at least one of a space, a comma, and a period.

12. The apparatus according to claim 1, wherein
the selection of the range is performed by a user specifying the range using a mouse.

13. The apparatus according to claim 1, wherein
the display has a touch panel function, and
the selection of the range is performed by a user specifying the range using a finger on the touch panel.

14. The apparatus according to claim 1, wherein
the display is a projector that projects the image, and
the range selected by the user is acquired by photographing a position of a fingertip of the user with respect to the projected image and by recognizing movement of the fingertip.

15. A method of outputting character recognition results, the method comprising:
identifying a character area corresponding to each character included in an image;
performing character recognition processing for each of the identified character areas to obtain character recognition results;
storing the obtained character recognition results in association with position coordinates of each of the character areas;
determining a specific character from the stored character recognition results;
changing position coordinates of the character area being stored in association with the determined specific character to extend the character area corresponding to the determined specific character;
displaying the image on a display;
acquiring a range selected by a user in the displayed image; and
outputting, based on the results of the character recognition processing stored in association with the position coordinates of each of the characters after the changing, character recognition results corresponding to a plurality of character areas included in the selected range.

16. A non-transitory computer readable storage medium storing a program for causing a computer to perform:
identifying a character area corresponding to each character included in an image;
performing character recognition processing for each of the identified character areas to obtain character recognition results;
storing the obtained character recognition results in association with position coordinates of each of the character areas;
determining a specific character from the stored character recognition results;
changing position coordinates of the character area being stored in association with the determined specific character to extend the character area corresponding to the determined specific character;
displaying the image on a display;
acquiring a range selected by a user in the displayed image; and
outputting, based on the results of the character recognition processing stored in association with the position coordinates of each of the characters after the changing, character recognition results corresponding to a plurality of character areas included in the selected range.

17. A non-transitory computer readable storage medium storing a program for causing a computer to perform:
identifying a character area corresponding to each character included in an image;
performing character recognition processing for each of the identified character areas to obtain character recognition results;
storing the obtained character recognition results in association with position coordinates of each of the character areas;
determining a specific character from the stored character recognition results; and
changing position coordinates of the character area being stored in association with the determined specific character to extend the character area corresponding to the determined specific character,
wherein, when a user selects a range in the image that is displayed on a display, character recognition results corresponding to a plurality of character areas included in the selected range are outputted based on the results of the character recognition processing stored in association with the position coordinates of each of the characters after the changing.

* * * * *